F. SYMANZIK.
PACKING DEVICE FOR BEARING BOXES.
APPLICATION FILED OCT. 4, 1918.
1,288,277.  Patented Dec. 17, 1918.
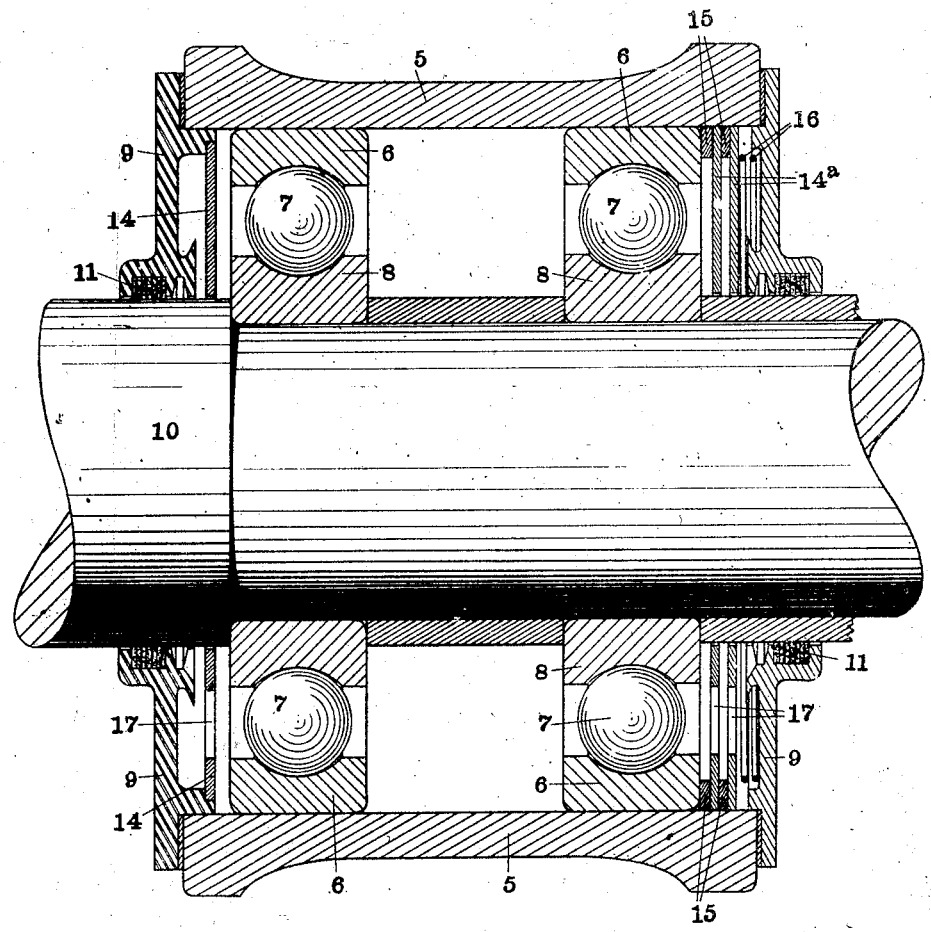
Witnesses:  Inventor:

UNITED STATES PATENT OFFICE.

FRANZ SYMANZIK, OF SCHWEINFURT, GERMANY.

PACKING DEVICE FOR BEARING-BOXES.

1,288,277.  Specification of Letters Patent.  Patented Dec. 17, 1918.

Application filed October 4, 1918. Serial No. 256,926.

*To all whom it may concern:*

Be it known that I, FRANZ SYMANZIK, a subject of the King of Prussia, residing at No. 1 Kesslergasse, Schweinfurt, in Germany, have invented new and useful Improvements in Packing Devices for Bearing-Boxes, of which the following is a specification.

This invention relates to a packing for the casings or boxes of bearings within which parts formed with, or attached to the shaft, are rotating, so that the lubricant filled in the said casing to a certain level will be given a rotative impulse by adhesion and centrifugal force; and the object of the invention is to overcome the defective effect of the rotation of the oil with respect to the perfect closure of the clearance between the shaft and the casing. Generally it is impossible to sufficiently tighten the usual stuffing box encircling the shaft in such a manner that it can resist the constant destructive action of the oil splashed upon it. This will especially be the case in ball bearings in which the row of balls and their retainer-ring have the effect to drive the lubricant outwardly like a centrifugal pump and to cause a circulation of the oil past the stuffing box.

The invention resides in providing rigid packing means between the rotating parts mounted upon the shaft and the opening in the casing through which the shaft passes, in order to prevent the flow of the oil to that passage and to the stuffing box placed there, when it gyrates in the casing. The invention essentially consists in the construction, arrangement and combination of baffle plates or confining disks which, together with the surrounding wall of the casing, form an annular space in which the oil is held and permitted to be driven around without the possibility of flashing down toward the stuffing box.

The invention further comprises means for mounting and fixing the said disks in the casing, and passages to allow the reconduction of the oil which might have escaped beyond the said packing disks. The peculiar construction of said improvements will appear from the following description and claims.

For a detailed explanation of two embodiments of the invention reference may be had to the accompanying drawing forming a part of this specification, and in which a longitudinal sectional elevation of a journal ball-bearing, containing the said two constructional forms of the packing, is represented.

The cylindrical box or casing 5 in which are mounted two ball bearings 7 having race rings 6 and 8 of the common type to support the shaft 10, is closed at its ends by fixed end walls or covers 9 in the usual manner. Central openings in said covers permit of the passage of the shaft, while stuffing boxes 11 of any suitable construction, preferably composed of felt- or leather washers, are disposed in the edge of the perforations and serve the purpose of closing the clearance. If the end of a shaft is to be journaled, one side of the casing can be entirely closed by a fixed wall.

Packing disks made of thin plates or sheet metal are located between the ball bearings 6, 7, 8 and the covers 9 respectively. The packing disk 14 on the left side of the casing is placed in a circular depression of the cover 9 and retained therein by friction, a small space being left between the ball bearing and the disk, and another between the disk and the cover. The connection of said parts may be obtained by any other means, such as screws, rivets, or by soldering and the like. On the right side of the casing two disks 14ª are used which are separated from one another and from the ball bearing by distance rings 15. In this case the disks are removably arranged in the casing and resiliently pressed toward the ball bearing by a spring 16, so that the disks and rings are allowed of self-adjustment and tightening under changes of temperature. Any number of disks can be applied, and it is evident that owing to their nearly embracing of the shaft and the formation of a number of small spaces between the ball bearing and the cover a labyrinth effect is obtained besides the separation of a middle oil-chamber in which the ball bearings are located. The disks 14 and 14ª are perforated in their lower part and in a certain distance from the outer edges of the disks; the openings 17 which are preferably so located that they communicate with the ball-containing space of the rings 6 and 8, are provided to allow refeeding of the oil which might have escaped through the small passage between the inner edges of said disks and the shaft or a sleeve mounted thereon.

The operation and advantages of the new packing are as follows:

The arrangement of a number of small spaces between the rotating bearing members and the cover on the one hand prevents the oil which gyrates in the middle chamber from contacting the covers and being thrown toward the stuffing-boxes, and on the other hand permits the oil of flowing around the cylindrical wall of the casing under the action of the centrifugal force and the revolving impulse received from the ball bearings, thus being in constant contact with the balls. When the shaft rotates, the oil contained in the outer spaces adjacent to the covers is partly drawn through the perforations 17 by the sucking effect of the ball bearings, so that the level will sink and the oil which at rest assembles in the lower part of the casing and wets the lower part of the shaft and stuffing-boxes, will be removed therefrom and distributed in the entire casing. This will further be a bar to the escape of the oil from the casing. Said stuffing-box is, therefore, only at rest operative.

Instead of the ball bearings other rotative parts, such as the collar of step bearings, can be employed and will also transmit a gyratory impulse to the lubricant.

What I broadly claim as my invention and desire to secure by Letters Patent, is—

1. The combination with a bearing casing, of partitions provided therein and separating a middle chamber from outer spaces, perforations in the lower parts of said partitions establishing communication of the spaces with said chamber, a shaft supported in the bearing casing, and means projecting from, and rotating with the shaft, which means are adapted to transmit a gyratory impulse to the oil contained in the casing.

2. In a bearing, the combination with a closed casing having a plurality of spaces provided in it by partitions, perforations in the lower part of said partitions permitting circulation of the lubricating oil through all spaces, of a shaft supported in said casing, and bearing members united with, and projecting from said shaft, said members being adapted to transmit a gyratory impulse to the oil contained in the bearing.

3. A packing for bearing casings, comprising a partition extending across the casing vertical to the axis thereof and forming a plurality of spaces, a perforation in the lower part of said partition establishing communication of the spaces, and rotatable means mounted in a middle space and adapted to transmit a gyratory impulse to the lubricating oil.

4. In a bearing, the combination with a casing, of partitions mounted therein and separating a number of spaces between the end walls of the casing, perforations provided in the lower part of said partitions and establishing communication of all spaces, a shaft supported in the casing and extending through said casing and partitions, and means projecting from said shaft into a central space and being adapted to transmit a gyratory impulse to the oil contained in the said casing.

5. In a bearing, the combination with a casing having end walls, of partitions mounted therein vertical to the axis thereof and separating outer and inner spaces between the end walls, perforations in the lower part of said partitions establishing communication of all spaces, a shaft extending through said end walls and partitions, and a number of ball bearings mounted upon said shaft and being adapted to transmit a gyratory impulse to the oil contained in the casing.

6. In a packing for bearings, the combination with a casing, of a number of disks mounted therein and capable of separating a plurality of outer and inner spaces, said disks being perforated in the lower part to allow communication of all spaces, a shaft extending through the casing and disks, and means projecting from said shaft into an inner space and adapted to transmit a gyratory impulse to the oil contained in the casing.

7. In a packing for bearings, the combination with a casing, of a number of disks mounted therein and capable of separating a plurality of outer and inner spaces, said disks being perforated in the lower part, means for fixing the said disks in the casing, a shaft extending through the casing and said disks, a stuffing box arranged between the casing and the shaft, and means projecting from the shaft into an inner space and adapted to transmit a gyratory impulse to the oil contained in the casing.

8. In a packing for bearings, the combination with a casing, of a cover closing the end of the casing, a number of disks capable of separating outer and inner spaces in the casing, the lower part of said disks being perforated, means for fixing said disks in place, a stuffing box arranged in a central aperture of said cover, a shaft extending through the cover and disks, and bearing means projecting from the shaft into an inner space and adapted to transmit a gyratory impulse to the oil contained in the casing.

In testimony whereof I have signed my name to this specification in the presence of two subscribing witnesses.

FRANZ SYMANZIK.

Witnesses:
 LILLI SCHNITZER,
 AUGUST LEYMFTZ.